(12) United States Patent
Krattiger

(10) Patent No.: US 10,818,245 B2
(45) Date of Patent: Oct. 27, 2020

(54) TOUCH SWITCH WITH DIMMABLE BACKLIGHTING

(71) Applicant: ERP POWER, LLC, Moorpark, CA (US)

(72) Inventor: Steven C. Krattiger, Northridge, CA (US)

(73) Assignee: ERP Power, LLC, Moorpark, CA (US)

( * ) Notice: Subject to any disclaimer, the term of this patent is extended or adjusted under 35 U.S.C. 154(b) by 0 days.

(21) Appl. No.: 15/962,758

(22) Filed: Apr. 25, 2018

(65) Prior Publication Data

US 2018/0308436 A1  Oct. 25, 2018

Related U.S. Application Data

(60) Provisional application No. 62/490,011, filed on Apr. 25, 2017.

(51) Int. Cl.
*G09G 3/34* (2006.01)
*H05B 45/10* (2020.01)
*H05B 47/105* (2020.01)

(52) U.S. Cl.
CPC ............ *G09G 3/3406* (2013.01); *H05B 45/10* (2020.01); *H05B 47/105* (2020.01); *G09G 2320/0686* (2013.01); *G09G 2360/144* (2013.01)

(58) Field of Classification Search
CPC ............... G06F 1/3262; G09G 3/3406; G09G 2320/0686; G09G 2360/144; H05B 33/0845; H05B 37/0227
See application file for complete search history.

(56) References Cited

U.S. PATENT DOCUMENTS

| 4,121,204 | A |  | 10/1978 | Welch et al. |
| 5,399,940 | A |  | 3/1995 | Hanna et al. |
| 5,434,757 | A | * | 7/1995 | Kashiwagi ............ B60N 2/797 362/501 |
| 8,274,233 | B2 | * | 9/2012 | Altonen ............... H01H 13/023 315/131 |
| 2009/0204239 | A1 |  | 8/2009 | Netzel, Sr. et al. |
| 2011/0304270 | A1 |  | 12/2011 | Scarpelli |
| 2017/0017324 | A1 |  | 1/2017 | O'Keeffe |
| 2017/0102493 | A1 | * | 4/2017 | Shivell ...................... G01J 5/24 |

OTHER PUBLICATIONS

International Search Report and Written Opinion issued in corresponding PCT Application No. PCT/US2018/029419, dated Jul. 6, 2018, 8 pages.

* cited by examiner

*Primary Examiner* — Nelson M Rosario

(74) *Attorney, Agent, or Firm* — Lewis Roca Rothgerber Christie LLP

(57) ABSTRACT

A touch sensor for controlling intensity of lighting electrically connected thereto, the touch sensor including a touch sensor interface for detecting a touch of a user, a power supply connected to the touch sensor for controlling the intensity of the lighting, and a backlight behind the touch sensor interface, and including a plurality of light sources for illuminating different portions of the touch sensor interface.

11 Claims, 2 Drawing Sheets

TOUCH SWITCH WITH DIMMABLE BACKLIGHTING

CROSS-REFERENCE TO RELATED APPLICATIONS

This utility patent application claims priority to and the benefit of U.S. Provisional Application No. 62/490,011 filed on Apr. 25, 2017, entitled Touch Switch With Dimmable Backlighting, the entire contents of which is incorporated herein by reference.

BACKGROUND

1. Field

Aspects of embodiments of the present disclosure relate to a touch sensor device for controlling a dimming function of lighting connected thereto.

2. Description of the Related Art

Unlike simple on/off light switches, dimmer switches may be used to control different levels of brightness of the lighting to which they are connected. Although conventional touch switches, or touch sensors, may contain a full power factor correction (PFC)-regulated direct current (DC) power supply within a single gangbox, conventional dimmer switches commonly use a mechanical potentiometer slide switch that is used in connection with a mechanical press-on/off switch for full light control.

Additionally, although other conventional dimmer switches may incorporate mechanical sliders, mechanical switches, or even touch sensors, for controlling light intensity, such conventional dimmer switches are typically simple, and do not contain a full PFC-regulated DC power supply within a single gangbox. That is, there does not yet exist an AC-to-DC dimmer switch combo that is housed within a single gang-box, and that is operated through a touch sensor interface.

SUMMARY

Aspects of embodiments of the present disclosure relate to a touch sensor device for controlling a dimming function of lighting connected thereto, and to a method of operating the same.

According to an embodiment of the present disclosure, there is provided a touch sensor for controlling intensity of lighting electrically connected thereto, the touch sensor including a touch sensor interface for detecting a touch of a user, a power supply connected to the touch sensor for controlling the intensity of the lighting, and a backlight behind the touch sensor interface, and including a plurality of light sources for illuminating different portions of the touch sensor interface.

In some embodiments, the backlight is configured to operate the light sources in a low power nightlight mode when the lighting is turned off.

In some embodiments, the touch sensor interface is configured to detect a tap from the user, and wherein the touch sensor is configured to control the power supply to either turn the lighting off, to drive the lighting intensity to a preset level, or to maximize the intensity of the lighting.

In some embodiments, the touch sensor is configured to control the backlight such that a light intensity of the backlight corresponds to the intensity of the lighting.

In some embodiments, the backlight is configured to detect an intensity of power output by the power supply to the lighting, and wherein the backlight is configured to control the light intensity of the light sources based on the detected intensity of power output.

In some embodiments, first circuitry for operating the touch sensor interface and second circuitry for operating the backlight are located on a single printed-circuit-board (PCB).

In some embodiments, the touch sensor includes a single gangbox, wherein the complete touch sensor interface and the PFC power-supply circuitry are contained in the single gangbox.

In some embodiments, the backlight is configured to control the light sources such that a corresponding one of the light sources that is closest to the touch of the user is on, and such that others of the light sources are off.

In some embodiments, the plurality of light sources comprise differently colored lights.

In some embodiments, the touch sensor includes a computer interface configured to enable the user to choose which of the colored lights are used.

In some embodiments, the touch sensor includes a computer interface configured to enable the user to set a maximum voltage output and/or a minimum voltage output by the power supply, or configured to enable the user to set a maximum constant current output by the power supply.

In some embodiments, the touch sensor interface comprises a capacitive linear touch sensor.

In some embodiments, the touch sensor interface is configured to control the power supply based on the detected touch.

In some embodiments, the power supply includes a power factor correction (PFC)-correcting power supply.

In some embodiments, the touch sensor includes a microprocessor that is configured to measure time to determine a total amount of time of the detected touch.

According to another aspect of the present disclosures, a method of controlling a touch sensor comprising a backlit touch sensor interface for detecting a touch of a user is provided. The method includes detecting the touch of the user; determining a location of the touch on the touch sensor interface; determining an amount of time for which the touch occurs; determining the touch as a tap when the determined amount of time is less than a reference amount of time; turning lighting electrically connected to the touch sensor from on to off or from off to on when the touch is determined to be the tap; determining whether the lighting is on or off; turning on backlighting of the touch sensor interface when it is determined that the lighting is off; turning on a portion of the backlighting in an area of the touch sensor interface corresponding to the touch when the touch is determined to not be the tap; and performing a dimming operation of the lighting when the touch is determined to not be the tap.

BRIEF DESCRIPTION OF THE DRAWINGS

These and other features and aspects of the present invention will be appreciated and understood with reference to the specification, claims, and appended drawings wherein:

DETAILED DESCRIPTION

Figure 1:
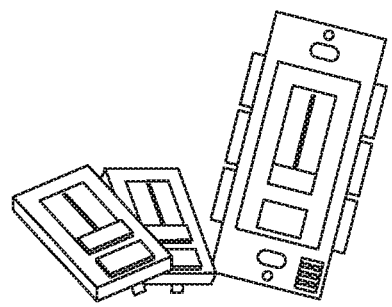
FIG. 1 is a conventional light switch with dimmer functionality.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, a server, cloud storage, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present disclosure provide a single touch sensor interface for combining all prior switching functions and dimming functions into a single touch sensor, thereby allowing a user to use a single tap to turn a lighting unit on or off, and/or also allowing the user to move their finger across the touch sensor interface to adjust an overall light level of the lighting unit.

The disclosed embodiments may contain a backlight within the touch sensor interface that changes an intensity of, and/or a location of, light output by the backlight in proportion to the intensity of the ambient light. Accordingly, the user may receive instant feedback on the intensity of the subject ambient light even when the user is not in the vicinity of the lighting unit that is controlled to adjust the subject ambient light.

The disclosed embodiments may also be capable of a low power nightlight setting, wherein one or more LEDs or other light sources of the backlight are illuminated at a low level when the lighting unit corresponding to the subject ambient light are turned off, thereby enabling the user to find the touch sensor in darkness.

The disclosed embodiments may improve manufacturability by placing all touch sensor circuitry and backlighting on a single printed circuit board (PCB). The disclosed embodiments enable replacement of conventional mechanical sliders and pushbuttons by implementing a single touch interface, thereby eliminating any need for moving parts and eliminating the possibility of mechanical failures associated therewith, while increasing the overall expected lifetime of the product.

As will be described below, the disclosed embodiments provide the following: a single user interface/touch sensor interface that allows both tap-on/tap-off control of lighting, while also allowing full dimming capability; an intelligent backlight incorporated within a touch sensor/the touch sensor interface, such that a backlight tracks the intensity of the power-supply DC output, thereby giving the user instant feedback on the overall lighting level; an incorporated low power nightlight mode that enables the user to find the touch sensor/switch in the dark when the lighting controlled by the touch sensor is off, or to identify (e.g., by color or location) which switch is to be turned on; incorporation of any color, mix, or multicolored backlighting within a touch sensor interface, where color selection may be set during manufacturing, or may be set at a time of installation through use of a computer interface and software; maximum and minimum trim circuits to allow the user to set the maximum and minimum voltage outputs at the time of installation; optional maximum and minimum voltage settings that may be entered into the light switch at installation through the use of a computer interface and software; elimination of moving parts to thereby increase product lifetime; and reduction of cost of an overall product incorporating one or more of the embodiments by eliminating mechanical switches, sliders, and other associated electronics.

FIG. 1 is a conventional light switch with dimmer functionality.

As described above, conventional dimmer switches include a self-contained AC-to-DC power converter with Power Factor Correction (PFC). The conventional dimmer switch may be used to smoothly drive LED lighting from a minimum voltage to a maximum voltage by using mechanical switches and sliders, thereby allowing full control of one or more connected LED lights. However, the conventional dimmer switch uses a mechanical slider for operation.

Figure 2:
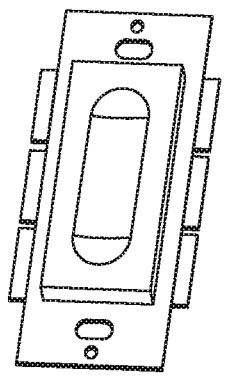
FIG. 2 is a touch sensor light switch according to an embodiment of the present invention.

FIG. 2 is a touch sensor light switch according to an embodiment of the present invention.

Embodiments of the present invention, unlike the conventional dimmer switch, use a single touch sensor interface to obviate any need for a faceplate with the associated mechanical slider and pushbutton controls, thereby simplifying an entirety of the interface of the touch sensor, while decreasing cost and improving product lifetime.

Figure 3:
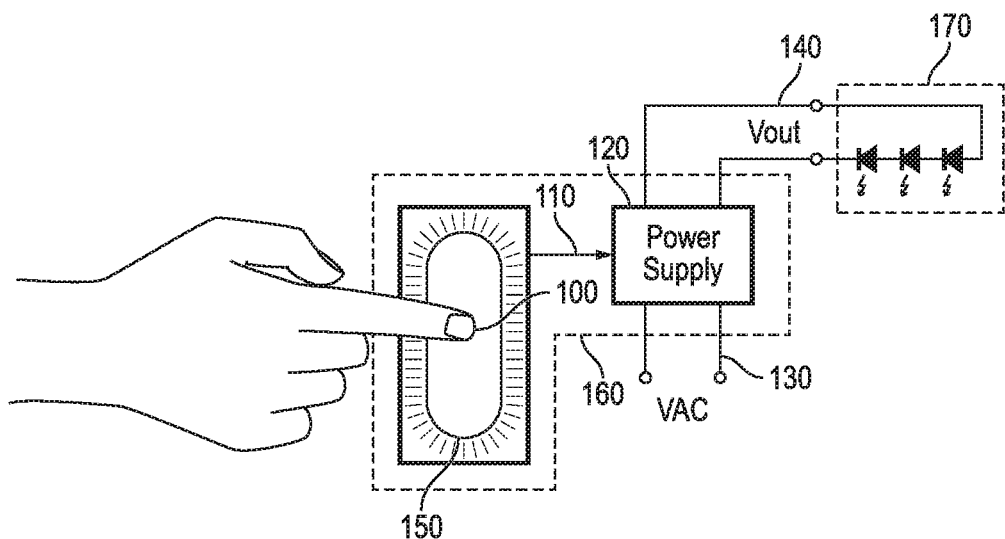
FIG. 3 is a block diagram of a touch sensor light switch according to an embodiment of the present invention.

FIG. 3 is a block diagram of a touch sensor light switch according to an embodiment of the present invention.

A touch sensor device 160 may include a touch sensor interface (e.g., a dimmer switch) 100 and a PFC-correcting power supply 120. The touch sensor interface 100 of the present embodiment is used to detect the touch of a user. The touch sensor interface 100 may include a linear touch sensor. The touch sensor interface 100 is shown in FIG. 3 as an oval. However, it should be note that the touch sensor interface of other embodiments may be any size or shape. An entirety of the touch sensor interface 100 may be sensitive to proximity of a conductive object, such as a fingertip of the user (e.g., by using a capacitive touch detecting method, or a linear touch sensing method). By touching different areas of the touch sensor interface 100, different values (e.g., electrical voltages or currents) may be produced by the touch sensor interface 100. An area 150 located beneath the touch sensor interface 100 may include an LED or other light-emitting device to function during a nightlight mode.

The touch sensor interface 100 may be connected directly to a power supply, which may be a PFC-correcting power supply 120. The PFC-correcting power supply 120 may receive AC voltage 130 at an input thereof, and may convert the AC voltage to produce and output DC voltage 140 at an output thereof. The DC voltage (or current) that is output by the PFC-correcting power supply 120 may be adjusted to be higher or to be lower based upon a signal 110 that is sent from the touch sensor interface 100 to the PFC-correcting power supply 120.

Values output by the touch sensor interface 100 may be used to vary the signal 110 that is output by the touch sensor interface 100 to drive the PFC-correcting power supply 120. Accordingly, the PFC-correcting power supply 120 can be used to directly control the voltage/current that is supplied to LED lighting 170 that is electrically connected to the touch sensor device 160. Accordingly, the user can directly touch the touch sensor interface 100, and the touch sensor device may smoothly (e.g., immediately) adjust the light intensity of the lighting, which may be LED lighting 170.

The touch sensor interface 100 may be controlled by an onboard microprocessor that is capable of measuring time, and that is capable of sensing touch by the user. If the touch sensor interface 100 detects a relatively short touch activity (e.g., a touch by the user that lasts for less than a few milliseconds), the touch sensor interface 100 may determine that the touch was intended to be a "tap." In the present embodiment, a single tap may be detected by the touch sensor interface 100, and the touch sensor interface 100 may drive the PFC-correcting power supply 120 such that the LED lighting 170 is simply turned from on to off, or is simply turned from off to on. If the touch sensor interface 100 detects a longer touch activity, a dimming mode may be activated to allow the user to smoothly dim the LED lighting 170 from full-on to full-off and anywhere in between. The user may control the intensity of the LED lighting 170 by moving their finger up or down along the touch sensor interface 100.

The touch sensor interface 100 of the present embodiment my also include one or more backlights (e.g., a backlight comprising multiple lights or LEDs). A primary backlight may be used to illuminate an entire surface of the touch sensor interface 100, and may increase brightness to match, or to correspond to, a target brightness of the LED lighting 170. The primary backlight may also increase brightness in a direction from a bottom of the touch sensor interface 100 to a top of the touch sensor interface 100 in a manner to follow the user's finger location, in a manner to show different colors, etc. A secondary backlight, may be located in the area 150 below the touch sensor interface 100, and may be a relatively low-power LED that is turned on only when the LED lighting 170 is turned off, thereby allowing the user to locate the touch sensor interface 100 in relative darkness.

The DC voltage 140 can be connected to any number of different types of LED lighting available on the market. However, each LED light or string of lights has a different minimum voltage where the light is OFF, and different maximum voltage and current settings to ensure the light is not over-driven, causing it to burn out. The values corresponding to the minimum and maximum voltages may be known at installation, but might not be known during manufacturing, making the ability to trim these settings at the time of installation a valuable feature.

Figure 4:
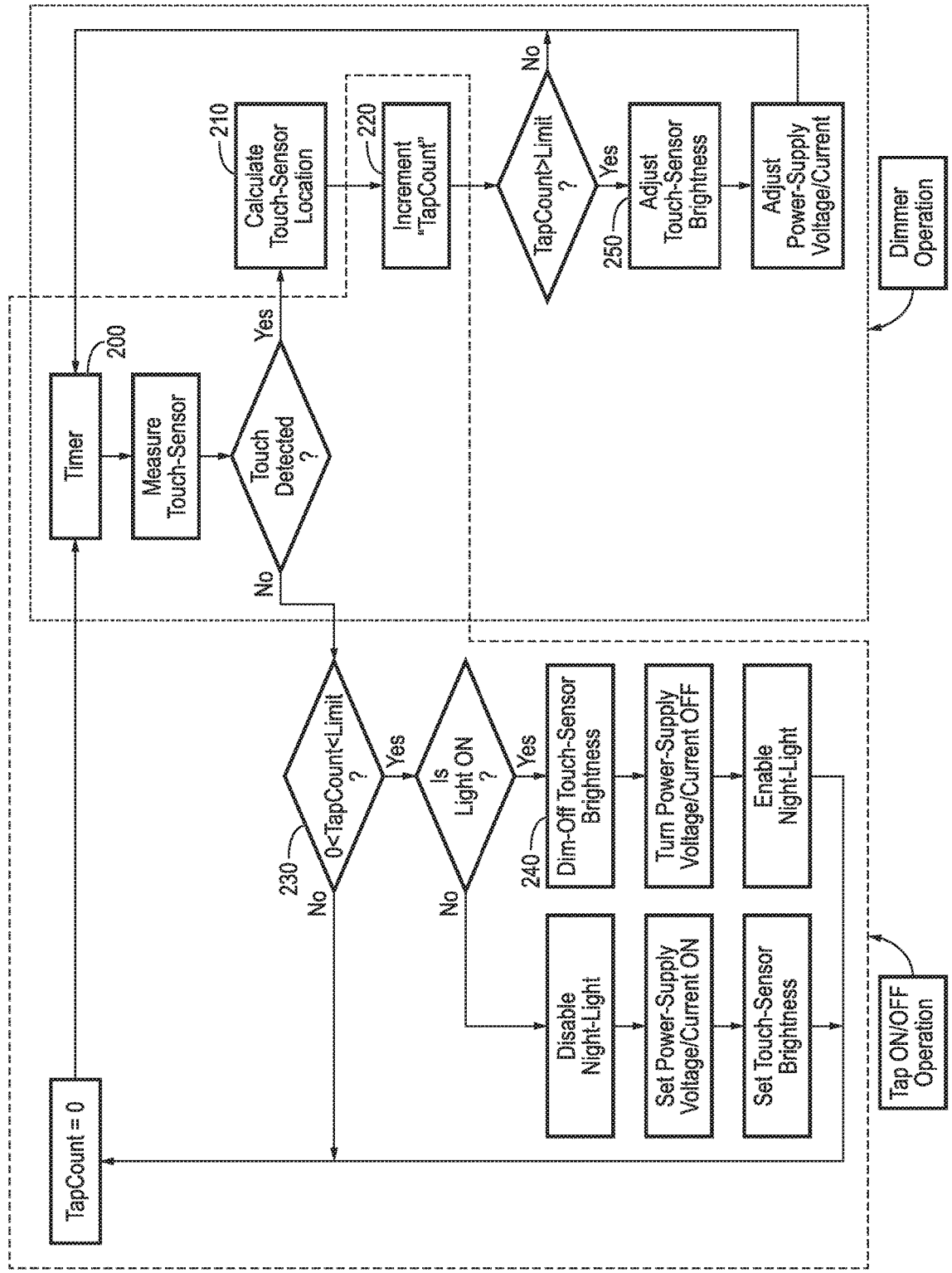
FIG. 4 is a flow chart describing operation of a touch sensor light switch according to an embodiment of the present invention.

FIG. 4 is a flow chart describing operation of a touch sensor light switch according to an embodiment of the present invention.

The following flowchart outlines the functionality of a touch sensor device with dimmable backlighting. The functionality of the touch sensor may include a timed loop. The timed loop may utilize a timer 200 that measures touch of the touch sensor interface 100 at precise time intervals.

When a touch event is detected, a location of the touch on the touch sensor interface 100 may be calculated. That is, at 210, the touch sensor device 160 may estimate and record a location of the touch, and a "TapCount" parameter may be incremented at 220. When the TapCount parameter has not reached a given limit, which may be configurable to a number of milliseconds, then the method may return to a beginning of the timed loop to determine whether any other touch events occur.

If the user removes their finger from the touch sensor interface 100 within a short period, the TapCount will be set to a value that is below the given limit at 230. When a touch is no longer detected, and when the TapCount is below the given limit, the touch sensor device 160 may determine the occurrence of a "Tap On/Off" event, and may immediately change the light state (e.g., either from on to off or from off to on) at 240. In some embodiments, when the LED lighting 170 is already on, the LED lighting 170 may be turned off, put in a low-power mode, and a nightlight mode may be enabled to turn on the backlight located in the area 150 beneath the touch sensor interface 100. When the LED lighting 170 is already off, the nightlight mode may be disabled, the supply and touch sensor backlight may be turned on.

When the user keeps their finger on the touch sensor interface 100 for more than the given time limit, the intensity of the backlight of the touch sensor interface 100 may be updated to match the finger location with respect to the touch sensor interface 100 at 250. The voltage/current of the PFC-corrected power supply 120 may also be updated at 250. As long as the user keeps the finger engaged with the touch sensor interface 100, the touch sensor device 160 may update the intensity of the LED lighting 170 in real-time.

Once the user removes their finger from the touch sensor interface 100, the TapCount may be reset at 230, and the system may return to the beginning of the timed loop, and may wait for another touch sensor event to occur.

Accordingly, embodiments of the present invention provide the following advantages: a single touch sensor can be used for complete on/off control and dimming control of installed lighting; an intuitive user interface that is similar to today's touchscreen interfaces; obviation of moving parts in the touch sensor interface, thereby eliminating mechanical wear and increasing overall lifetime of the touch sensor; a backlit touch sensor interface capable of providing immediate feedback by indicating lighting intensity; a low power nightlight mode that enables detection of the touch sensor interface in darkness; ease of installation of LED lighting using existing switch boxes/wiring without need to retrofit a power converter between the touch sensor interface/switch box and the outlet; the ability to use the touch sensor with different lighting configurations while accounting for variation in lighting elements; and configuration of the operating range of the power supply to correspond to the lighting controlled by the touch switch.

What is claimed is:

1. A touch sensor for controlling intensity of lighting electrically connected thereto, the touch sensor comprising:
   a touch sensor interface for detecting a touch of a user;
   a power supply connected to the touch sensor for controlling the intensity of the lighting; and
   a backlight behind the touch sensor interface, and comprising a plurality of light sources for illuminating an entire surface of the touch sensor interface, the backlight being configured to detect an intensity of power output by the power supply to the lighting, and to control a light intensity of the light sources illuminating the entire surface of the touch sensor interface based on the detected intensity of power output to provide feedback to a user;
   a single gangbox, wherein an entirety of the touch sensor interface and a power factor correction (PFC)-correcting power supply are contained in the single gangbox; and
   a computer interface configured to enable the user to adjust a maximum voltage output setting and/or a minimum voltage output setting of the power supply, or configured to enable the user to adjust a maximum constant current output setting of the power supply.

2. The touch sensor of claim 1, wherein the backlight is configured to operate the light sources in a low power nightlight mode when the lighting is turned off.

3. The touch sensor of claim 1, wherein the touch sensor interface is configured to detect a tap from the user, and wherein the touch sensor is configured to control the power supply to either turn the lighting off, to drive the intensity of the lighting to a preset level, or to maximize the intensity of the lighting.

4. The touch sensor of claim 1, wherein a first circuitry for operating the touch sensor interface and a second circuitry for operating the backlight are located on a single printed-circuit-board (PCB).

5. The touch sensor of claim 1, wherein the plurality of light sources comprise differently colored lights.

6. The touch sensor of claim 5, wherein the computer interface is further configured to enable the user to choose which of the colored lights are used.

7. The touch sensor of claim 1, wherein the touch sensor interface comprises a capacitive linear touch sensor.

8. The touch sensor of claim 1, wherein the touch sensor interface is configured to control the power supply based on the detected touch.

9. The touch sensor of claim 1, wherein the power supply comprises the power factor correction (PFC)-correcting power supply.

10. The touch sensor of claim 1, further comprising a microprocessor that is configured to measure time to determine a total amount of time of the detected touch.

11. A method of controlling a touch sensor comprising a backlit touch sensor interface for detecting a touch of a user, the method comprising detecting the touch of the user;
   determining a location of the touch on the backlit touch sensor interface;
   determining an amount of time for which the touch occurs;
   determining the touch as a tap when the determined amount of time is less than a reference amount of time;
   turning lighting electrically connected to the backlit touch sensor interface from on to off or from off to on when the touch is determined to be the tap;
   determining whether the lighting is on or off;
   turning on backlighting of the backlit touch sensor interface when it is determined that the lighting is off;
   turning on a portion of the backlighting in an area of the backlit touch sensor interface corresponding to the touch when the touch is determined to not be the tap; and
   performing a dimming operation of the lighting when the touch is determined to not be the tap,
   wherein the backlighting comprises a plurality of light sources for illuminating an entire surface of the backlit touch sensor interface, and is configured to detect an intensity of power output to the lighting, and to control a light intensity of light sources of the backlighting for illuminating the entire surface of the backlit touch sensor interface based on the detected intensity of power output to provide feedback to a user,
   wherein the touch sensor comprises a single gangbox, wherein an entirety of the backlit touch sensor interface and a power factor correction (PFC)-correcting power supply are contained in the single gangbox, and
   wherein the touch sensor further comprises a computer interface configured to enable the user to adjust a maximum voltage output setting and/or a minimum voltage output setting of the power supply, or configured to enable the user to adjust a maximum constant current output setting of the power supply.

* * * * *